Oct. 22, 1968  G. LARSSON  3,406,441
METHOD AND ARRANGEMENT FOR MOUNTING ELASTICALLY FLEXIBLE
SEALING RINGS IN INTERNAL GROOVES
Filed Sept. 27, 1965
2 Sheets-Sheet 1
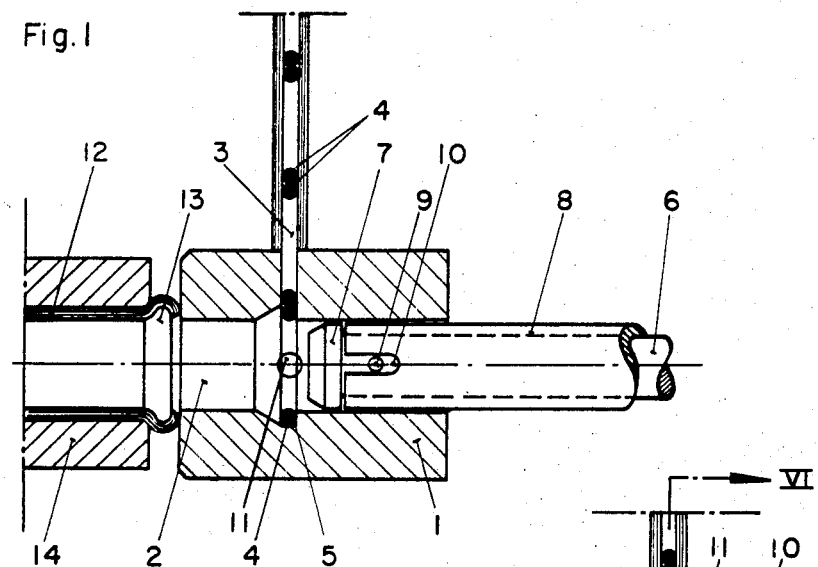
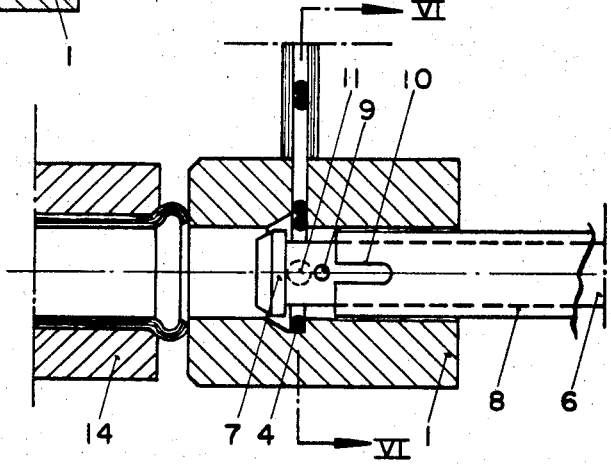
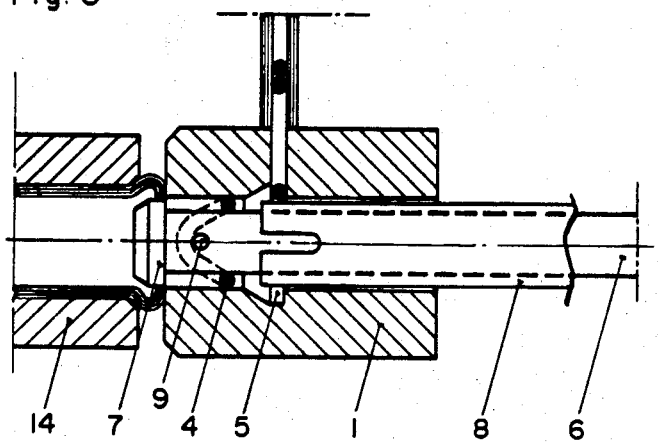
INVENTOR
GUNNAR LARSSON
BY *Larson and Taylor*
ATTORNEYS Oct. 22, 1968 G. LARSSON 3,406,441
METHOD AND ARRANGEMENT FOR MOUNTING ELASTICALLY FLEXIBLE
SEALING RINGS IN INTERNAL GROOVES
Filed Sept. 27, 1965 2 Sheets-Sheet 2

INVENTOR
GUNNAR LARSSON

BY Larson and Taylor

ATTORNEYS

United States Patent Office 3,406,441
Patented Oct. 22, 1968

3,406,441
METHOD AND ARRANGEMENT FOR MOUNTING ELASTICALLY FLEXIBLE SEALING RINGS IN INTERNAL GROOVES
Gunnar Larsson, Halsingborg, Sweden, assignor to Aga-Platforadling Aktiebolag, Halsingborg, Sweden, a corporation of Sweden
Filed Sept. 27, 1965, Ser. No. 490,187
Claims priority, application Sweden, Oct. 2, 1964, 11,843/64
6 Claims. (Cl. 29—451)

ABSTRACT OF THE DISCLOSURE

Method and apparatus for mounting an elastically flexible sealing ring into an internal groove. The ring is placed into an enlarged portion of a channel, another portion of which channel has an internal diameter equal to the inner diameter of the ring. Radially inward bends are formed in the ring and these bends are re-oriented to axial bends as the ring is pushed through the said portion of the channel by bosses on a push rod which is movably mounted in the channel. The internal groove to be fitted with the ring is located at the end of the said portion of the channel. An enlarged head on the end of the push rod and a sleeve surrounding the push rod are used for pressing the ring into the internal groove.

---

The present invention relates to a method and an arrangement for rapid and easy mounting of an elastically flexible sealing ring in an internal groove of a workpiece. More particularly, the invention relates to the mounting of sealing rings in tubular connecting sleeves according to Swedish Patent 180,594.

The method according to the invention consists in deforming the sealing ring, which is preferably of rubber, plastic or the like, to create radial inward bends at two or more points, re-orienting the inward bends into axially directed bends pointing in the same direction, so that the outer circumference of the ring lies on a cylinder or revolution substantially equal in diameter to the normal inside diameter of the sealing ring, bringing the sealing ring into a position substantially radially inwardly of the internal groove in the workpiece, and then pressing the ring outwardly to a position completely within the groove.

An arrangement according to the invention for carrying out the described method comprises a guiding support having a channel therein as well as bending and feeding means in the channel for transporting a sealing ring fed into the channel along the same up to the interior groove provided in the workpiece. A more detailed explanation of the construction of the arrangement is given in the ensuing description of an embodiment, which is shown on the attached drawings.

Figure 6:
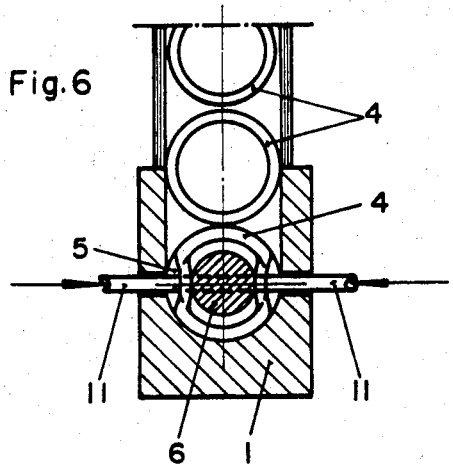

FIGURES 1–5 are axial sections of a schematic arrangement according to the invention, the movable parts of which are shown in different operative positions for carrying out the method of the invention. FIG. 6 is a cross section along the line VI—VI of FIG. 2.

The arrangement comprises a guide member 1 having a channel 2 provided therein and a slot 3 extending radially with regard to the channel. The slot is adapted to receive sealing rings 4 of the O-ring type and made of rubber, plastic or similar material which is elastically flexible, whereby the ring will always strive to retain its normal shape and reassume it after bending. Opposite the slot 3 there is provided in the channel 2 a supporting notch 5 having an outer diameter equal to that of the ring 4. The inside diameter of the channel 2 is equal to that of the ring 4. Positioned in the channel 2 is a sliding push rod 6 having a head portion 7 and a sleeve 8 slidable on the rod. The outside diameters of the head 7 and the sleeve 8 are approximately the same as the diameter of the channel 2 and the thickness of the sleeve 8 is equal to that of the ring 4. Spaced a short distance from the head 7 on the rod 6 are a pair of diametrically opposed bosses 9, the sleeve 8 having recesses 10 for receiving the bosses 9. A pair of pins 11, see FIG. 6, are axially slidable in the guide member 1 and can be pushed into the supporting notch 5.

The workpiece, such as a tubular sleeve 12, having an interior groove 13 for a sealing ring 4 is held in position outside the channel 2 by means of a suitable fixture 14. Sealing rings 4 are fed sequentially into the slot 3. The innermost ring 4 will then take the position in the supporting notch 5 shown in FIG. 1, provided that the push rod 6 stands laterally thereof, as shown in FIG. 1.

The head portion 7 of the rod is then pushed through the ring 4, see FIG. 2, and the pins 11 are pushed in and cause radially directed bands to be formed in the ring 4, as shown in FIG. 6.

During the continued leftward movement of the rod 6, the bosses 9 engage the said bends and thereupon cause axially directed bends to be formed in the ring 4 as the latter is pulled along in the channel 2 such that the outer circumference lies on a cylinder of revolution having a diameter smaller than the normal outside diameter of the ring and preferably equal to the normal inside diameter of the ring. At this time, the sleeve 8 has moved forward to block entry of the next ring 4 into the supporting notch 5, as is apparent from FIG. 3.

Figure 4:
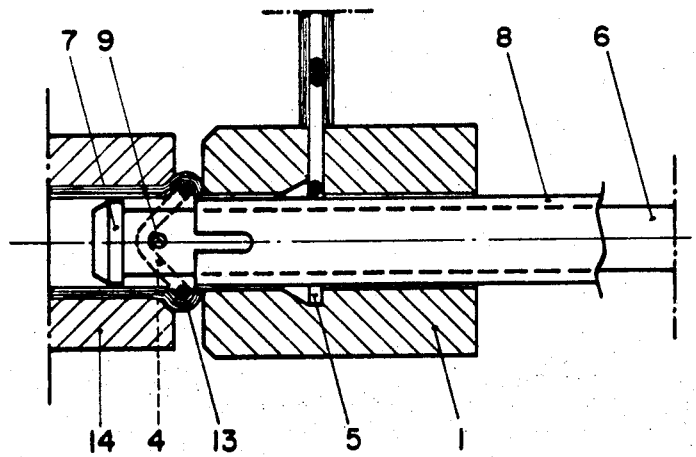

Upon the continued movement of the rod 6 into the sleeve 12, as shown in FIG. 4, the outer portions of the ring 4 engage the interior groove 13 of the sleeve 12. The movement of the sleeve 8 continues until the forward end thereof stands immediately adjacent the interior groove 13, as shown in FIG. 4.

Figure 5:
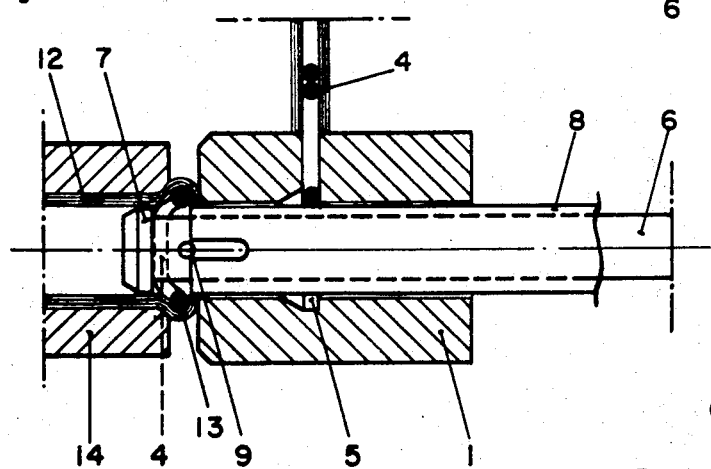

The rod 6 is then pulled back to the right, and the head 7 presses the sealing ring 4 into the interior groove 13, as shown in FIG. 5, the end of the sleeve 8 serving simultaneously as a support as the head 7 moves toward the said end. The rod 6 and the sleeve 8 are then pulled back together to the starting position shown in FIG. 1, during which time the following ring 4 drops into the starting position in the supporting notch 5. The whole process now described can be run at high speed.

The described method of mounting the sealing ring is subject to the following modification: the rod 6 is pushed leftwardly only far enough for the head 7 to be immediately to the left of the groove 13, whereupon the sleeve 8 is pushed to the left and drives the sealing ring 4 into engagement with the groove 13, the head 7 serving then as a support for the sealing ring. Thereafter, the sleeve 8 and the rod 6 are pulled back together to the starting position.

The construction of the arrangement can obviously be varied within the scope of the invention. The push rod 6, the sleeve 8 and the pins 11 are preferably coupled together so as to perform their respective movements in suitable coordination. The pins 11 may be replaced by any means for exerting pressure, even by streams of compressed air. The bosses 9 may be in the form of shoulders etc. The sealing rings may be of other than O-ring cross section, such as square. More than two pins or bosses may be provided.

What I claim is:

1. A method of mounting an elastically flexible sealing ring in an internal groove comprising the steps of feeding the sealing ring into a channel, a portion of which channel has a cross-section smaller than the outer cross-section of the ring, creating radial inward bends at least two points of the ring, reorienting said inward bends into axially extending bends so that the outer circumference of the ring lies on a cylinder of revolution equal in diameter to the normal inside diameter of the ring, and pushing the axially bent ring through said portion of the channel to a position generally radially inwardly of the internal groove in the workpiece and pressing the ring outwardly to a position within the groove.

2. An apparatus for mounting an elastically flexible sealing ring in an interior groove of a workpiece comprising a guide member having a channel, at least a portion of which channel is substantially equal in diameter to the inside diameter of the sealing ring to be mounted, a notch formed about the periphery of the channel and having an outer diameter substantially equal to the outside diameter of said ring, means, including a slot in the side of the channel for feeding rings into said notch, a push rod mounted in the channel and having at least two bosses formed thereon, means for forming radial inward bends in said ring as the ring is in the notch, and said push rod being movable into said portion of the channel such that the bosses engage the inward bends of the ring and reorient them into axial bends as the push rod carries the ring through said channel portion to the said groove in the workpiece, and means for urging the ring into the groove.

3. The apparatus of claim 2 wherein the push rod includes a head on the side of bosses towards the workpiece for pressing the groove into the groove.

4. The apparatus of claim 2 including a sleeve surrounding the push rod on the side of the bosses away from the workpiece and slidable relative to said rod, said sleeve being movable to the said workpiece to assist in urging the ring into the groove.

5. The apparatus of claim 3 wherein the thickness of the sleeve is substantially equal to the thickness of the sealing ring.

6. The apparatus of claim 4 wherein the push rod includes an enlarged head on the side of the bosses towards the workpiece for pressing the ring into the groove.

References Cited

UNITED STATES PATENTS

| | | | |
|---|---|---|---|
| 2,357,139 | 8/1944 | Seme | 29—235 X |
| 2,510,206 | 6/1950 | Barkan et al. | 29—235 X |
| 2,977,994 | 4/1961 | Xenis. | |
| 3,132,414 | 5/1964 | De Bacco et al. | 29—235 |
| 3,180,015 | 4/1965 | Thompson et al. | 29—451 X |
| 3,183,587 | 5/1965 | Baskell | 29—451 |
| 3,145,463 | 8/1964 | Hockett | 29—451 |
| 3,289,286 | 12/1966 | Belanger | 29—235 |

CHARLIE T. MOON, *Primary Examiner.*